United States Patent
Wetzel et al.

(10) Patent No.: US 9,570,730 B2
(45) Date of Patent: Feb. 14, 2017

(54) BRIDGE POWER CONNECTOR

(71) Applicant: Tyco Electronics Corporation, Berwyn, PA (US)

(72) Inventors: John Joseph Wetzel, Menlo Park, CA (US); Allen McClinton, Los Gatos, CA (US)

(73) Assignee: TYCO ELECTRONICS CORPORATION, Berwyn, PA (US)

( * ) Notice: Subject to any disclaimer, the term of this patent is extended or adjusted under 35 U.S.C. 154(b) by 0 days.

(21) Appl. No.: 14/725,030

(22) Filed: May 29, 2015

(65) Prior Publication Data
US 2016/0351882 A1  Dec. 1, 2016

(51) Int. Cl.
*H01R 13/514* (2006.01)
*H01M 2/20* (2006.01)
*H01R 13/502* (2006.01)

(52) U.S. Cl.
CPC ............ *H01M 2/204* (2013.01); *H01M 2/206* (2013.01); *H01R 13/502* (2013.01)

(58) Field of Classification Search
CPC ....... H01R 9/24; H01R 9/2408; H01R 9/2433; H01R 9/2441; H01R 9/245
USPC ....... 439/723, 638, 731, 906, 284, 289–291, 439/295
See application file for complete search history.

(56) References Cited

U.S. PATENT DOCUMENTS

| | | | | |
|---|---|---|---|---|
| 2,838,739 A * | 6/1958 | Winkler | ............. | H01R 13/26 439/295 |
| 3,091,746 A * | 5/1963 | Winkler | ............. | H01R 13/26 439/295 |
| 4,083,617 A * | 4/1978 | Wyatt | ............. | H01R 13/28 439/295 |
| 4,537,456 A * | 8/1985 | Brown | ............. | H01R 4/2466 439/293 |
| 4,734,060 A * | 3/1988 | Kawawada | ............. | H01R 13/28 439/295 |
| 5,308,258 A * | 5/1994 | Hatsios | ............. | H01R 13/28 439/284 |
| 5,915,998 A * | 6/1999 | Stidham | ............. | H01R 4/36 439/521 |
| 7,001,194 B2 * | 2/2006 | Yang | ............. | H01R 23/27 439/295 |
| 7,413,476 B2 * | 8/2008 | Ma | ............. | H01R 13/05 439/352 |
| 7,544,095 B2 * | 6/2009 | Droesbeke | ............. | H01R 13/502 439/607.41 |

(Continued)

*Primary Examiner* — Abdullah Riyami
*Assistant Examiner* — Thang Nguyen

(57) ABSTRACT

A bridge power connector includes upper and lower connector assemblies. The upper connector assembly has an upper housing holding an upper power conductor connected to a first electrical component. The lower connector assembly has a lower housing holding a lower power conductor electrically connected to a second electrical component. The upper housing is removably coupled to the lower housing using securing mechanisms to form a low-profile housing. The upper power conductor extends from a first side of the low-profile housing while the lower power conductor extends from a second side of the low-profile housing. The upper and lower power conductors extend along a mating plane of the low-profile housing. The upper power conductor is separable from the lower power conductor when the upper housing is removed from the lower housing.

19 Claims, 3 Drawing Sheets

(56) References Cited

U.S. PATENT DOCUMENTS

| | | | | |
|---|---|---|---|---|
| 7,670,169 B1* | 3/2010 | Pai | ................... | H01R 13/655 |
| | | | | 439/465 |
| 8,435,067 B2* | 5/2013 | Wegener | ............ | H01R 13/5833 |
| | | | | 439/445 |
| 8,454,378 B2* | 6/2013 | Osterhart | ........... | H01R 13/4223 |
| | | | | 439/284 |
| 8,579,634 B2* | 11/2013 | Raquin | .................. | H01R 13/18 |
| | | | | 439/31 |
| 8,641,440 B2* | 2/2014 | Hariharesan | ......... | H01R 13/187 |
| | | | | 439/295 |
| 2003/0003812 A1* | 1/2003 | Chadbourne | ........ | H01R 9/2408 |
| | | | | 439/723 |
| 2011/0244735 A1* | 10/2011 | Chen | .................... | H01R 12/724 |
| | | | | 439/731 |

* cited by examiner

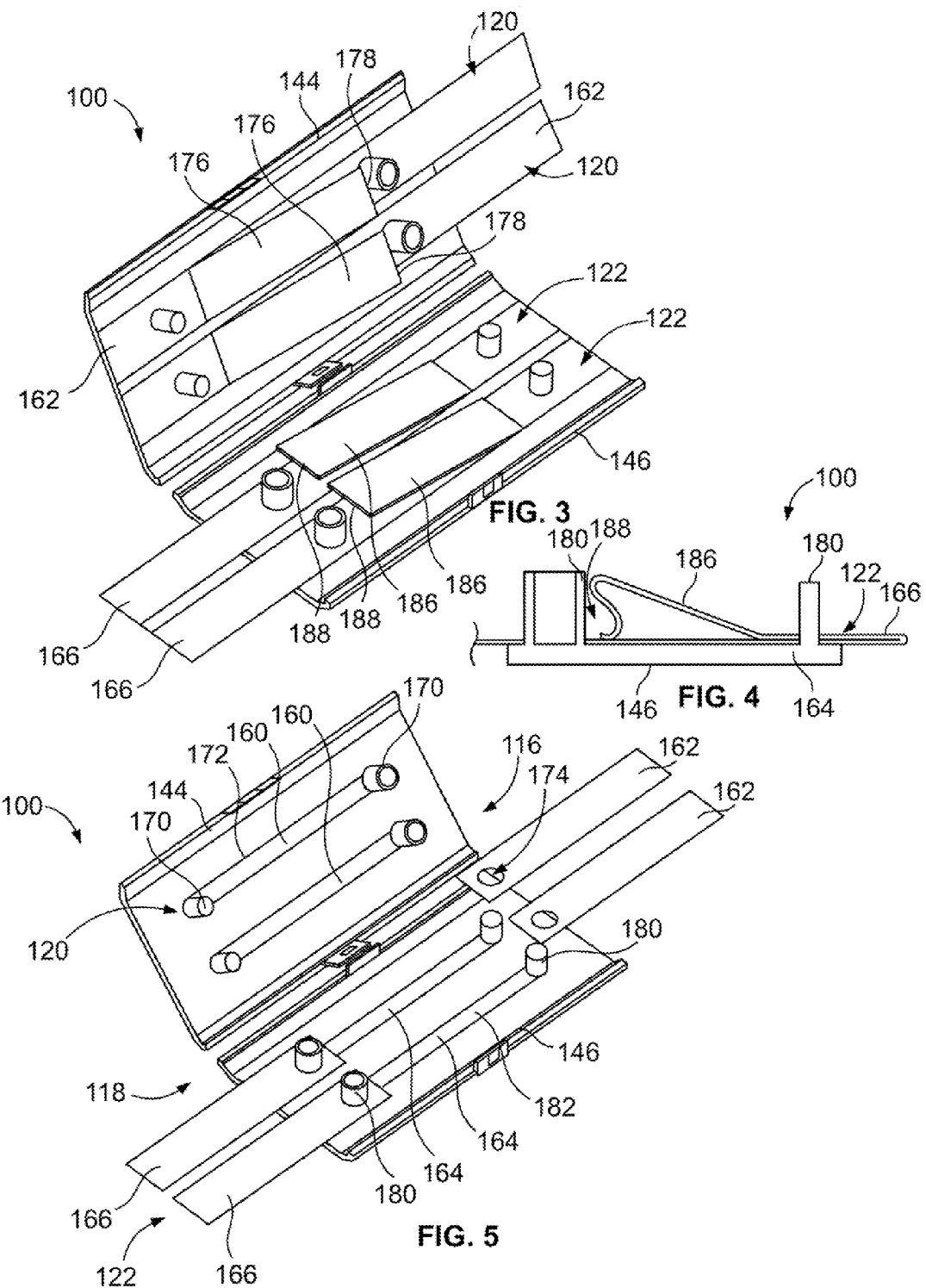

BRIDGE POWER CONNECTOR

BACKGROUND OF THE INVENTION

The subject matter herein relates generally to a bridge power connector.

Electronic devices typically connect various powered components together, such as connecting a battery to a device's internal electrical components. However, such internal connections are typically permanent in nature. For example, bus bars may transfer power from batteries throughout a device and are often fixed (such as via welding, brazing, or other) to the batteries. However, some conventional designs provide a separable power connection through mated connectors. Such mated connectors are typically bulky. The mating interface such connectors create is often much larger in size and weight than a non-separable and permanent power connection. Some electronic devices are unable to implement such conventional connectors as the mating interface requires and occupies too much internal space within the electronic device to be practical. Additionally, such connectors typically provide a contact terminated at an end of a wire or bus bar. At the interface between the wire or bus bar terminals, the system typically experiences high impedance and power loss. As a result, significant heat may be generated at the interface.

A need remains for a low profile and separable interface connector to route power within electronic devices.

BRIEF DESCRIPTION OF THE INVENTION

In one embodiment, a bridge power connector is provided including an upper connector assembly and a lower connector assembly. The upper connector assembly has an upper housing holding an upper power conductor configured to be electrically connected to a first electrical component, with the upper power conductor having a separable mating interface. The lower connector assembly has a lower housing holding a lower power conductor configured to be electrically connected to a second electrical component. The lower power conductor has a separable mating interface mated to the separable mating interface of the upper power conductors to electrically connect and transmit power between the first and second electrical components. The upper housing is removably coupled to the lower housing using securing mechanisms to form a low-profile housing. The upper power conductor extends from a first side of the low-profile housing while the lower power conductor extends from a second side of the low-profile housing. The upper and lower power conductors extend along a mating plane of the low-profile housing. The upper power conductor is separable from the lower power conductor when the upper housing is removed from the lower housing.

In another embodiment, a bridge power connector is provided including an upper connector assembly having an upper housing holding positive and negative upper power conductors configured to be electrically connected to a first electrical component. The upper power conductors include upper contacts held by the upper housing. The upper contacts have posts extending therefrom defining separable mating interfaces. The bridge power connector also includes a lower connector assembly having a lower housing holding positive and negative lower power conductors configured to be electrically connected to a second electrical component. The lower housing is removably coupled to the upper housing to electrically connect the upper power conductors and lower power conductors. The lower power conductors include lower contacts held by the lower housing having posts extending therefrom. The posts of the lower connector assembly define separable mating interfaces mated to the separable mating interfaces of the upper power conductors to electrically connect and transmit power between the first and second electrical components. At least some of the posts are male posts and at least some of the posts are female posts. The female posts receive corresponding male posts in an interference fit to electrically connect the upper and lower contacts. The upper contacts are separable from the lower contacts when the upper housing is removed from the lower housing.

In a further embodiment, a bridge power connector is provided including an upper connector assembly having an upper housing holding positive and negative upper power conductors configured to be electrically connected to a first electrical component. The upper power conductors include upper bus bar leads held by the upper housing. The upper bus bar leads have spring beams configured to be resiliently deflected defining separable mating interfaces. The bridge power connector includes a lower connector assembly having a lower housing holding positive and negative lower power conductors configured to be electrically connected to a second electrical component. The lower housing is removably coupled to the upper housing to electrically connect the upper power conductors and lower power conductors. The lower power conductors include lower bus bar leads held by the lower housing defining separable mating interfaces mated to the separable mating interfaces of the spring beams of the upper power conductors to electrically connect and transmit power between the first and second electrical components. The spring beams of the upper bus bar leads are resiliently deflected when mated with the lower bus bar leads to maintain an electrical connection between the upper and lower power conductors. The upper power conductors are separable from the lower power conductors when the upper housing is removed from the lower housing.

BRIEF DESCRIPTION OF THE DRAWINGS

FIG. 3 is an exploded view of the bridge power connector in accordance with an exemplary embodiment.

FIG. 4 is a cross sectional view of a portion of the bridge power connector showing power conductors in accordance with an exemplary embodiment.

FIG. 5 is an exploded view of the bridge power connector in accordance with an exemplary embodiment.

DETAILED DESCRIPTION OF THE INVENTION

Figure 1:
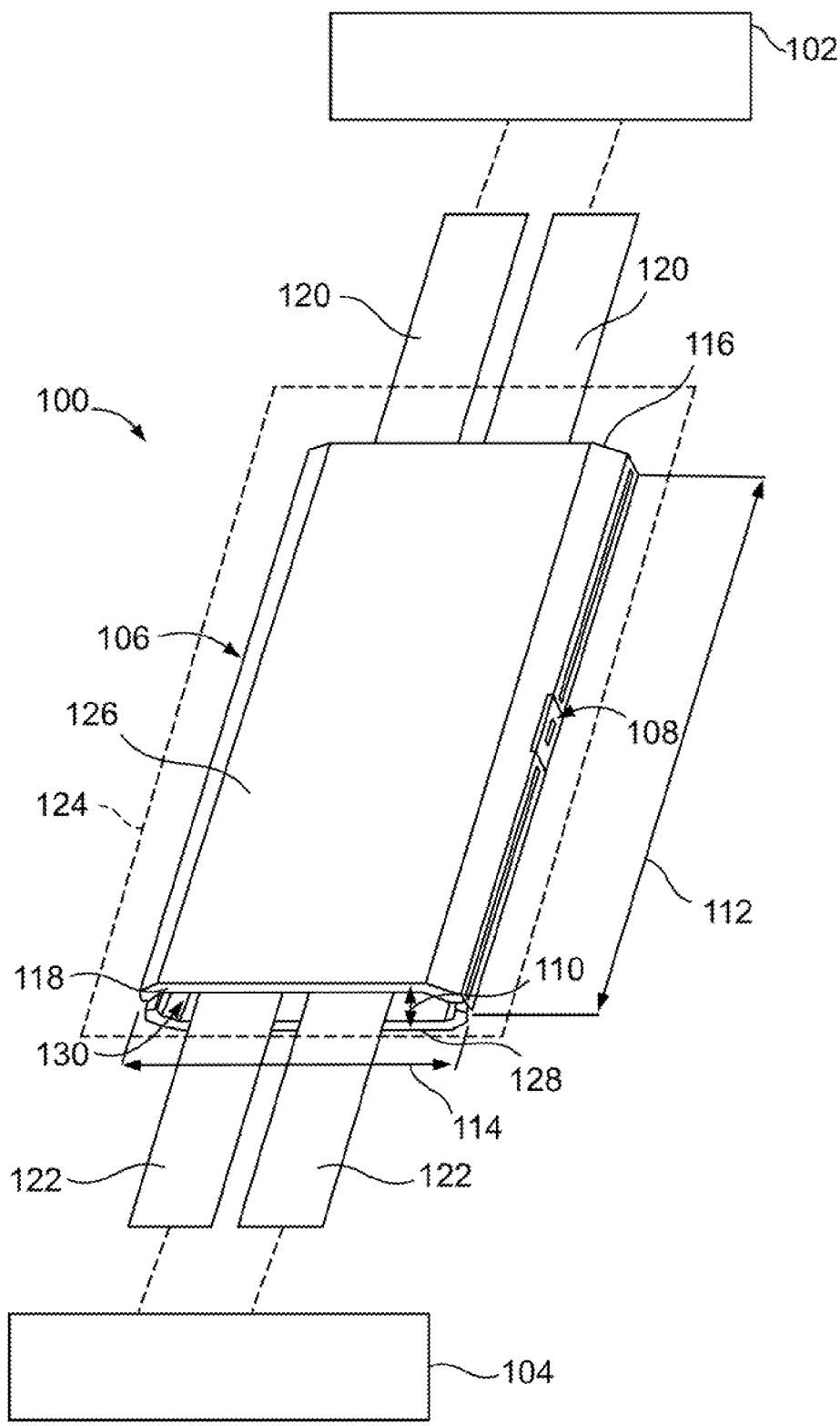
FIG. 1 is a perspective view of a bridge power connector formed in accordance with an exemplary embodiment.

FIG. 1 is a perspective view of a bridge power connector 100 formed in accordance with an exemplary embodiment. The bridge power connector 100 provides a power connection between a first electrical component 102 and a second electrical component 104. Optionally, the first electrical component 102 may be a battery and the second electrical component 104 may be a component configured to receive power from the battery, however other types of electrical components may be used in alternative embodiments. The bridge power connector 100 may be used in an electronic device, such as a hand held device, a computing device, a network device, and the like.

Embodiments of the bridge power connector 100 described herein may provide a separable connection that is configured for many mating cycles over a lifetime of the bridge power connector 100. For example, the bridge power connector 100 may be capable of being mated and unmated without damaging or destroying the components of the bridge power connector 100 or the components of either first or second electrical component 102, 104, respectively. The bridge power connector 100 may be capable of being assembled and disassembled. The bridge power connector 100 may be manufactured without crimping, soldering, or creating other permanent mechanical and electrical connections between electrical conductors of the bridge power connector 100. The bridge power connector 100 may provide an interference or spring connection between electrical conductors of the bridge power connector 100, which are capable of being mated and unmated numerous times over a lifetime of the components of the bridge power connector 100.

Embodiments of the bridge power connector 100 described herein may provide a low power connection, such as between approximately 4 and 10 amps and/or between approximately 1 and 5 volts. However, the bridge power connector 100 is not limited to such currents or voltages.

Embodiments of the bridge power connector 100 described herein may provide a low profile connection. The bridge power connector 100 includes a low profile housing 106. The low profile housing 106 may be opened and closed to separate and make an electrical connection between the first and second electrical components 102, 104. The low profile housing 106 may be secured in a closed portion using securing members 108 which may be provided at one or both sides of the low profile housing 106. Optionally, the securing members 108 may be latches, hinges, locks or other types of securing members 108.

The bridge power connector 100 has a low profile height 110 which is substantially less than a length 112 or a width 114 of the bridge power connector 100. For example, the height 110 may be less than 10% of the length 112 and/or may be less than 10% of the width 114. The low profile housing 106 extends between a first end 116 and a second end 118. The length 112 is defined between the first and second ends 116, 118. The low-profile provides a small package dimension for use in the electronic device.

Power conductors 120 extend from the first end 116 to the first electrical component 102. Power conductors 122 extend from the second end 118 to the second electrical component 104. Optionally, the first and second power conductors 120, 122 may be generally co-planar with a mating plane 124 of the bridge power connector 100. The mating plane 124 is located between a top 126 and a bottom 128 of the low profile housing 106. Optionally, the top 126 and bottom 128 may be generally parallel to the mating plane 124. Optionally, the mating plane 124 may be approximately centered between the top 126 and the bottom 128.

The low profile housing 106 includes a cavity 130. The power conductors 120, 122 extend into the cavity 130 and are electrically connected to each other within the cavity 130. For example, the power conductors 120 are electrically connected to the power conductors 122 at separable mating interfaces therebetween. In an exemplary embodiment, the power conductors 120 include both positive and negative power conductors. Similarly, the power conductors 122 include both positive and negative power conductors. While the illustrated embodiments show both positive and negative power conductors, various embodiments may include a bridge power connector having a single lead, such as a positive power lead or a negative power lead. Other various embodiments may have more than one positive lead and/or more than one negative power lead.

Figure 2:
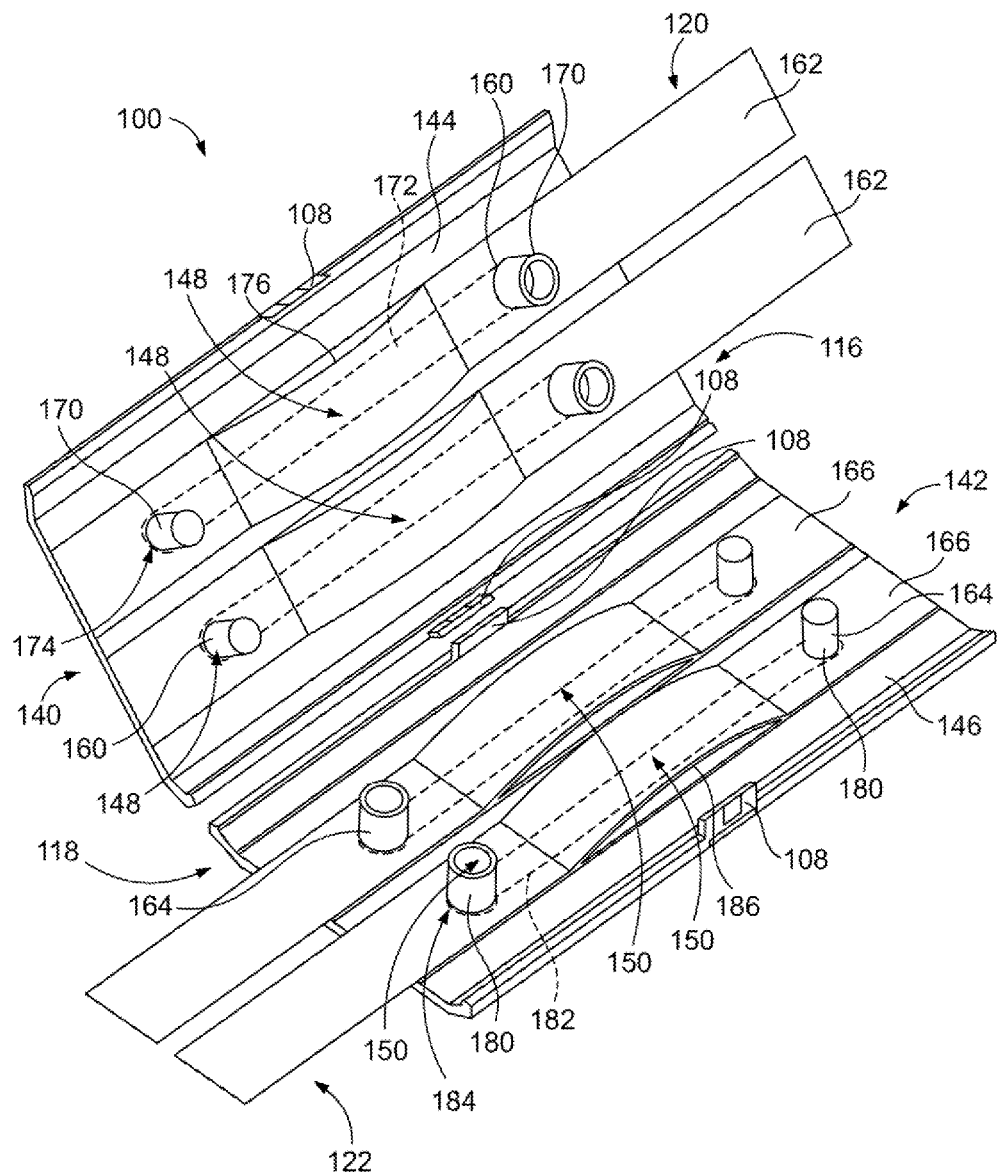
FIG. 2 is an exploded view of the bridge power connector in accordance with an exemplary embodiment.

FIG. 2 is an exploded view of the bridge power connector 100. The bridge power connector 100 includes an upper connector assembly 140 and a lower connector assembly 142. The upper connector assembly 140 includes an upper housing 144 holding the positive and negative power conductors 120, which may be referred to hereinafter as upper power conductors 120. The upper connector assembly 140 is electrically connected to the first electrical component 102 (shown in FIG. 1). The lower connector assembly 142 includes a lower housing 146 holding the positive and negative power conductors 122, which may be referred to hereinafter as lower power conductors 122. The lower connector assembly 142 is electrically connected to the second electrical connector 104 (shown in FIG. 1).

In an exemplary embodiment, the upper connector assembly 140 is separable from the lower connector assembly 142. The upper connector assembly 140 is electrically connected to the lower connector assembly 142 by removably coupling the upper housing 144 to the lower housing 146. For example, the upper housing 144 is removably coupled to the lower housing 146 using the securing mechanisms 108 to form the low profile housing 106. The securing mechanisms 108 may be mated and unmated facilitating field maintenance and installation. The securing mechanisms withstand the environment, such as vibration and impacts from use in the electronic device. The upper power conductors 120 are electrically connected to the lower power conductors 122 when the upper housing 144 is coupled to the lower housing 146. The upper power conductors 120 include separable mating interfaces 148 and the lower power conductors 122 include separable mating interfaces 150. In an exemplary embodiment, the separable mating interfaces 148 are electrically connected to the separable mating interfaces 150 when the upper housing 144 is coupled to the lower housing 146. When the upper housing 144 is removed from the lower housing 146, the separable mating interfaces 148, 150 separate to break the electrical connection therebetween.

In an exemplary embodiment, the upper and lower housings 144, 146 are made from a dielectric material, such as a plastic material. Optionally, the upper and lower housings 144, 146 may be molded. Optionally, the upper and lower housings 144, 146 may be molded around the power conductors 120, 122, respectively, such that the upper and lower power conductors 120, 122 are at least partially encased within the upper and lower housing 144, 146, respectively.

In an exemplary embodiment, the upper power conductors 120 include upper contacts 160 and upper bus bar leads 162. The lower power conductors 122 include lower contacts 164 and lower bus bar leads 166. The upper contacts 160 are held by the upper housing 144. The lower contacts 164 are held by the lower housing 146. Optionally, the upper and lower housings 144, 146 may define the cavity 130 (shown in FIG. 1) in a manner that accommodates different sized (for example, different widths, different heights) bus bar leads 162, 166. For example, depending on the particular application or the current carrying requirements, different sized bus bar leads 162, 166 may be received in the cavity 130 and mated to the upper contacts 160 and lower contacts 164. The different bus bar leads 162, 166 may be manufactured from different materials in various embodiments.

The upper bus bar leads 162 are coupled to the upper contacts 160 to secure the upper bus bar leads 162 in the upper housing 144. For example, in an exemplary embodiment, the upper contacts 160 include posts 170 extending from a base 172 (shown in phantom in FIG. 2). The base 172 is secured to the upper housing 144. For example, the base 172 may be embedded in the upper housing 144. The base 172 may be secured to the upper housing 144 by other processes in alternative embodiments, such as by heat staking, fusing, using adhesive, using fasteners, or by other methods. The posts 170 may be provided at or near the opposite ends of the base 172.

The upper bus bar leads 162 include openings 174 corresponding to the posts 170. The upper bus bar leads 162 are coupled to the upper contacts 160 by engagement of the posts 170 in the corresponding openings 174. Optionally, the openings 174 may be sized to receive the posts 170 in an interference fit to mechanically and electrically connect the upper bus bar leads 162 to the upper contacts 160. Optionally, the upper bus bar leads 162 may have tabs or other features that engage the posts 170 to mechanically and electrically connect the upper bus bar leads 162 to the upper contacts 160. Optionally, the upper bus bar leads 162 may be permanently connected to the upper contacts 160, such as by welding, soldering or by other methods. In all such cases, a robust electrical connection that can withstand vibration and impacts is made between the upper bus bar leads 162 and the upper contacts 160. In an exemplary embodiment, multiple posts 170 are used to provide multiple points of contact between the upper bus bar leads 162 and the upper contacts 160. Any number of posts 170 may be provided and used.

In alternative embodiments, rather than providing both upper contacts 160 and upper bus bar leads 162, the upper connector assembly 140 may include only upper bus bar leads 162. In such embodiments, the upper bus bar leads 162 may be secured to the upper housing 144 by a different process. Optionally, the upper housing 144 may include the posts 170 to mechanically secure the upper bus bar leads 162 to the upper housing 144. In such embodiments, the connection between the upper bus bar leads 162 and the posts 170 is only mechanical rather than being both mechanical and electrical.

In an exemplary embodiment, the upper bus bar leads 162 are stamped metal plates or thin metal films. The upper bus bar leads 162 are elongated and extend to the first electrical component 102. The upper bus bar leads 162 include spring beams 176 that are configured to be resiliently deflected against the lower bus bar leads 166 when the upper housing 144 is secured to the lower housing 146. The spring beams 176 may have a curved or arced shape, which may be at least partially compressed when mated with the lower bus bar leads 166. Optionally, the upper bus bar leads 162 may be folded over and have a double thickness (see, for example, FIG. 4) along a portion thereof. For example, the double thickness may extend substantially the entire distance between the first and second ends 116, 118. The double thickness portion may extend beyond both posts 170. Optionally, only a single thickness of the upper bus bar leads 162 may include or define the spring beams 176.

The lower bus bar leads 166 are coupled to the lower contacts 164 to secure the lower bus bar leads 166 in the lower housing 146. For example, in an exemplary embodiment, the lower contacts 164 include posts 180 extending from a base 182 (shown in phantom in FIG. 2). The base 182 is secured to the lower housing 146. For example, the base 182 may be embedded in the lower housing 146. The base 182 may be secured to the lower housing 146 by other processes in alternative embodiments, such as by heat staking, fusing, using adhesive, using fasteners, or by other methods. The posts 180 may be provided at or near the opposite ends of the base 182.

The lower bus bar leads 166 include openings 184 corresponding to the posts 180. The lower bus bar leads 166 are coupled to the lower contacts 164 by engagement of the posts 180 in the corresponding openings 184. Optionally, the openings 184 may be sized to receive the posts 180 in an interference fit to mechanically and electrically connect the lower bus bar leads 166 to the lower contacts 164. Optionally, the lower bus bar leads 166 may have tabs or other features that engage the posts 180 to mechanically and electrically connect the lower bus bar leads 166 to the lower contacts 164. Optionally, the lower bus bar leads 166 may be permanently connected to the lower contacts 164, such as by welding, soldering or by other methods. In all such cases, a robust electrical connection that can withstand vibration and impacts is made between the lower bus bar leads 166 and the lower contacts 164. In an exemplary embodiment, multiple posts 180 are used to provide multiple points of contact between the lower bus bar leads 166 and the lower contacts 164. Any number of posts 180 may be provided and used.

In alternative embodiments, rather than providing both lower contacts 164 and lower bus bar leads 166, the lower connector assembly 140 may include only lower bus bar leads 166. In such embodiments, the lower bus bar leads 166 may be secured to the lower housing 146 by a different process. Optionally, the lower housing 146 may include the posts 180 to mechanically secure the lower bus bar leads 166 to the lower housing 146. In such embodiments, the connection between the lower bus bar leads 166 and the posts 180 is only mechanical rather than being both mechanical and electrical.

In an exemplary embodiment, the lower bus bar leads 166 are stamped metal plates or thin metal films. The lower bus bar leads 166 are elongated and extend to the second electrical component 104. The lower bus bar leads 166 include spring beams 186 that are configured to be resiliently deflected against the upper bus bar leads 162 when the upper housing 144 is secured to the lower housing 146. The spring beams 186 may have a curved or arced shape, which may be at least partially compressed when mated with the upper bus bar leads 162. Optionally, the lower bus bar leads 166 may be folded over and have a double thickness (see, for example, FIG. 4) along a portion thereof. For example, the double thickness may extend substantially the entire distance between the first and second ends 116, 118. The double thickness portion may extend beyond both posts 180. Optionally, only a single thickness of the lower bus bar leads 166 may include or define the spring beams 186.

In an exemplary embodiment, at least some of the posts 170, 180 may be male posts and at least some of the posts 170, 180 may be female posts. For example, in the illustrated embodiment, each power conductor 120 includes a single male post and a single female post and each power conductor 122 includes a single male post and a single female post. Other arrangements are possible in alternative embodiments. For example, in an alternative embodiment, the upper power conductors 120 may include all male posts whereas the lower power conductors 122 may include all female posts or vice versa. The female posts receive corresponding male posts to create a mechanical and/or electrical connection between the upper power conductors 120 and the lower power conductors 122. For example, the female posts may include openings or receptacles that are sized to receive the corresponding male posts in a friction fit or an interference fit. The posts 170, 180 may be chamfered to guide mating of the male posts and female posts. In an exemplary embodiment, the posts 170, 180 are cylindrical; however other shapes are possible in alternative embodiments.

When the upper connector assembly 140 is connected to the lower connector assembly 142, an electrical connection is made between the upper bus bar leads 162 and the lower bus bar leads 166, such as through the spring beams 176, 186. When the upper connector assembly 140 is electrically connected to the lower connector assembly 142, an electrical connection is made between the upper contacts 160 and the lower contacts 164. For example, the posts 170 may directly engage the posts 180 to create an electrical path therebetween and such electrical path may be transferred to the bus bar leads 162, 166 by the electrical connections between the contacts 160, 164 and the bus bar leads 162, 166. As such, multiple redundant electrical paths are provided for efficient power transfer across the bridge power connector 100. Power loss is reduced by the multiple points of contact between the upper connector assembly 140 and the lower connector assembly 142. The large contact area created by the multiple points of contact lowers contact resistance, which, in turn, lowers the amount of connector power loss and lowers the amount of heat created in the bridge power connector 100.

FIG. 3 is an exploded view of the bridge power connector 100 in accordance with an exemplary embodiment. FIG. 3 illustrates the upper power conductors 120 in the upper housing 144 and the lower power conductors 122 in the lower housing 146. The upper bus bar leads 162 and lower bus bar leads 166, in the illustrated embodiment, differ from the embodiment shown in FIG. 2 in that the spring beams 176, 186 are shaped differently. The spring beams 176, 186 may be cantilevered beams. The spring beams 176, 186 may be generally flat and angled away from the housings 144, 146, respectively.

When the upper housing 144 is coupled to the lower housing 146, the spring beams 176 and/or 186 may be resiliently deflected against each other. Optionally, substantially the entire surface area of the flat spring beams 176, 186 may engage each other to create a large surface area for power transfer. In alternative embodiments, rather than multiple spring beams, the bridge power connector 100 may provide spring beams 176 on only the upper power conductors 120 and not on the lower power conductors 122, or vice versa.

The spring beams 176, 186 extend to distal ends 178, 188, respectively. Optionally, the distal ends 188 may be elevated from the housing 144, 146, respectively. Alternatively, the distal ends 188 may be folded under in a C-shape, an S-shape or another compressible, spring-like shape. The distal ends 178, 188 may be supported by another underlying portion of the corresponding bus bar leads 162, 166 and/or the underlying housing 144, 146 to support to the spring beams 176, 186. For example, such an arrangement is shown in FIG. 4.

FIG. 4 is a cross sectional view of a portion of the bridge power connector 100 showing one of the lower power conductors 122, including the lower contact 164 and the lower bus bar lead 166 in accordance with an exemplary embodiment. The spring beam 186 is ramped upward toward the distal end 188. The distal end 188 is folded under to form a compressible, spring-like member. The distal end 188 may rest or abut against the underlying portion of the lower bus bar lead 166. Compression of the spring beam 186 by the upper bus bar lead 162 (shown in FIG. 3) will resiliently bend or deflect the distal end 188, which causes an upward normal or return force against the upper bus bar lead 162 to ensure a quality electrical connection therebetween. FIG. 4 also shows the lower housing 146 mechanically and electrically connected to the lower bus bar lead 166. For example, the posts 180 extend through the lower bus bar lead 166.

FIG. 5 is an exploded view of the bridge power connector 100 in accordance with an exemplary embodiment. FIG. 5 illustrates the upper power conductors 120 in the upper housing 144 and the lower power conductors 122 in the lower housing 146. The upper contacts 160, including the bases 172, and the lower contacts 164, including the bases 182, are illustrated in FIG. 5.

The upper bus bar leads 162 and lower bus bar leads 166, in the illustrated embodiment, differ from the embodiment shown in FIG. 2 in that the bus bar leads 162, 166 are shaped differently. The bus bar leads 162, 166 do not include spring beams. The bus bar leads 162, 166 do not extend entirely across the housings 144, 146, but rather are provided near the ends 116, 118, respectively. When the bus bar leads 162, 166 are received in the housings 144, 146, the bus bar leads 162, 166 may be generally coplanar.

The lower bus bar leads 166 are illustrated coupled to the posts 180 of the lower contacts 164, but the upper bus bar leads 162 are illustrated uncoupled from the upper contacts 160. The openings 174 may be aligned with the posts 170 and then the upper bus bar leads 162 may be pressed onto the posts 170. The bases 172, 182 extend between the posts 170, 180 to electrically connect the bus bar leads 162, 166, rather than having the bus bar leads 162, 166 directly engaging each other as in the embodiments shown in FIGS. 2 and 3. The upper and lower contacts 160, 164 bridge the bus bar leads 162, 166.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

What is claimed is:
1. A bridge power connector comprising:
an upper connector assembly having an upper housing holding an upper power conductor configured to be electrically connected to a first electrical component, the upper power conductor having a separable mating interface, the upper power conductor comprises an upper bus bar lead extending exterior of the upper housing for termination to the first electrical component;

a lower connector assembly having a lower housing holding a lower power conductor configured to be electrically connected to a second electrical component, the lower power conductor having a separable mating interface mated to the separable mating interface of the upper power conductor to electrically connect and transmit power between the first and second electrical components, the lower power conductor comprises a lower bus bar lead extending exterior of the lower housing for termination to the second electrical connector;

wherein the upper housing is removably coupled to the lower housing using securing mechanisms to form a low-profile housing, the upper power conductor extending from a first side of the low-profile housing, the lower power conductor extending from a second side of the low-profile housing, the upper and lower power conductors extending along a mating plane of the low-profile housing, the upper power conductor being separable from the lower power conductor when the upper housing is removed from the lower housing.

2. The bridge power connector of claim 1, wherein the upper bus bar lead is a stamped metal plate and the lower bus bar lead is a stamped metal plate.

3. The bridge power connector of claim 1, wherein the upper bus bar lead comprises a spring beam configured to be resiliently deflected against the lower bus bar lead when the upper housing is secured to the lower housing.

4. The bridge power connector of claim 3, wherein the lower bus bar lead comprises a spring beam configured to be resiliently deflected against the upper bus bar lead when the upper housing is secured to the lower housing.

5. The bridge power connector of claim 4, wherein the spring beam of the lower bus bar lead directly engages the spring beam of the upper bus bar lead to form the separable mating interfaces of the upper and lower power conductors.

6. The bridge power connector of claim 3, wherein the spring beam includes a folded over end being compressed and spring loaded to induce normal forces in the spring beam to press against the lower bus bar lead when the upper housing is secured to the lower housing.

7. The bridge power connector of claim 3, wherein the spring beam is cantilevered outward to engage the lower bus bar lead.

8. The bridge power connector of claim 1, wherein the upper bus bar lead is folded over and has a double thickness along a portion thereof.

9. The bridge power connector of claim 1, wherein the upper power conductor comprises an upper contact held by the upper housing, the upper contact having at least one post extending therefrom, the upper bus bar lead include at least one opening receiving a corresponding post of the upper contact to mechanically and electrically connect the upper bus bar lead to the upper contact, the lower power conductor comprising a lower contact held by the lower housing, the lower contact having at least one post extending therefrom, the lower bus bar lead including at least one opening receiving a corresponding post of the lower contact to mechanically and electrically connect the lower bus bar lead to the lower contact.

10. The bridge power connector of claim 9, wherein at least one of the posts is a male post and at least one of the posts is a female post, the female post receives the corresponding male post in an interference fit to electrically connect the upper and lower contacts.

11. The bridge power connector of claim 9, wherein the upper contact is electrically and mechanically connected to the lower contact to electrically connect the upper bus bar lead and the lower bus bar lead.

12. The bridge power connector of claim 1, wherein the low profile housing has a height less than 10% of a width and a length of the low profile housing.

13. The bridge power connector of claim 1, wherein the upper power conductor is stacked above the lower power conductor in an abutting arrangement.

14. The bridge power connector of claim 1, wherein the securing mechanisms comprise latches configured to secure the upper housing to the lower housing in a latched position and configured to allow the upper housing and upper power conductor to be separated from the lower housing and lower power conductor in an unlatched position.

15. The bridge power connector of claim 1, wherein the low profile housing includes a cavity between the upper housing and the lower housing, the cavity defining the mating plane, the upper power conductor and the lower power conductor being arranged within the cavity such that the upper power conductor and the lower power conductor extend generally along the mating plane.

16. A bridge power connector comprising:
an upper connector assembly having an upper housing holding an upper power conductor configured to be electrically connected to a first electrical component, the upper power conductor includes an upper contact held by the upper housing, the upper contact having posts extending therefrom, the posts defining separable mating interfaces;

a lower connector assembly having a lower housing holding a lower power conductor configured to be electrically connected to a second electrical component, the lower housing being removably coupled to the upper housing to electrically connect the upper power conductor and the lower power conductor, the lower power conductor includes a lower contact held by the lower housing, the lower contact having posts extending therefrom, the posts of the lower connector assembly defining separable mating interfaces mated to the separable mating interfaces of the upper power conductor to electrically connect and transmit power between the first and second electrical components;

wherein at least some of the posts are male posts and at least some of the posts are female posts, the female posts receive corresponding male posts in an interference fit to electrically connect the upper and lower contacts, the upper contact being separable from the lower contact when the upper housing is removed from the lower housing.

17. The bridge power connector of claim 16, wherein the upper power conductor comprises an upper bus bar lead extending exterior of the housing for termination to the first electrical component, the upper bus bar lead being terminated to corresponding posts of the upper contact, the lower power conductor comprises a lower bus bar lead extending exterior of the housing for termination to the second electrical connector, the lower bus bar lead being terminated to corresponding posts of the lower contact.

18. The bridge power connector of claim 17, wherein the upper bus bar lead comprises a spring beam configured to be resiliently deflected against the lower bus bar lead when the upper housing is secured to the lower housing.

19. A bridge power connector comprising:
- an upper connector assembly having an upper housing holding positive and negative upper power conductors configured to be electrically connected to a first electrical component, the upper power conductors include upper bus bar leads held by the upper housing, the upper bus bar leads having spring beams configured to be resiliently deflected, the spring beams defining separable mating interfaces, the upper power conductors having upper contacts each having a base embedded in the upper housing and a portion extending from the upper housing for electrical connection with the corresponding upper bus bar lead;
- a lower connector assembly having a lower housing holding positive and negative lower power conductors configured to be electrically connected to a second electrical component, the lower housing being removably coupled to the upper housing to electrically connect the upper power conductors and lower power conductors, the lower power conductors include lower bus bar leads held by the lower housing, the lower bus bar leads defining separable mating interfaces mated to the separable mating interfaces of the spring beams of the upper power conductors to electrically connect and transmit power between the first and second electrical components, the lower power conductors having lower contacts each having a base embedded in the lower housing and a portion extending from the lower housing for electrical connection with the corresponding lower bus bar lead, the spring beams of the upper bus bar leads being resiliently deflected when mated with the lower bus bar leads to maintain an electrical connection between the upper and lower power conductors, the upper power conductors being separable from the lower power conductors when the upper housing is removed from the lower housing.

* * * * *